United States Patent
Miyamoto et al.

(10) Patent No.: US 7,179,006 B2
(45) Date of Patent: Feb. 20, 2007

(54) INK FOLLOWER

(75) Inventors: Masaru Miyamoto, Yokohama (JP); Yoji Takeuchi, Yokohama (JP); Kenji Sato, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 27 days.

(21) Appl. No.: 10/532,091

(22) PCT Filed: Oct. 27, 2003

(86) PCT No.: PCT/JP03/13721

§ 371 (c)(1),
(2), (4) Date: Apr. 21, 2005

(87) PCT Pub. No.: WO2004/037551

PCT Pub. Date: May 6, 2004

(65) Prior Publication Data

US 2006/0047017 A1    Mar. 2, 2006

(30) Foreign Application Priority Data

Oct. 25, 2002  (JP) .............................. 2002-311233

(51) Int. Cl.
*B43K 7/08* (2006.01)
(52) U.S. Cl. ...................... 401/142; 401/141
(58) Field of Classification Search ................ 401/141, 401/142
See application file for complete search history.

(56) References Cited

U.S. PATENT DOCUMENTS 4,671,691 A * 6/1987 Case et al. ................... 401/142
6,227,738 B1 * 5/2001 Ogura et al. ................ 401/142

FOREIGN PATENT DOCUMENTS

| JP | 8-142570 A | 6/1996 |
| JP | 10-315682 A | 12/1998 |
| JP | 2001-353993 A | 12/2001 |
| JP | 2003-285591 A | 10/2003 |

* cited by examiner

*Primary Examiner*—David J. Walczak
(74) *Attorney, Agent, or Firm*—Buchanan, Ingersoll & Rooney PC

(57) ABSTRACT

An ink follower which has stable followability regardless of a pen body specification, a flow rate for writing and a writing speed and does not cause back leaking of the ink originating in shortage in the ink follower in the middle of writing and scattering of the ink follower by impact applied to the pen body and which does not flow out from the ink reservoir in storing the pen body at a high temperature and provides a stable flow rate for writing. An ink follower is also provided which prevents the ink from volatilizing by shutting off the ink from the outside air (volatilization preventing property) and which prevents the ink from leaking in writing with the pen turned upward. The ink follower, for example, contains a non-volatile or slightly volatile organic solvent and a non-styrene base thermoplastic elastomer which is soluble or swollen in the organic solvent and showing viscoelasticity which is predominant in elastic response.

2 Claims, No Drawings

INK FOLLOWER

TECHNICAL FIELD

The present invention relates to an ink follower which is installed at a plug part in an ink reservoir for a writing instrument.

BACKGROUND ART

In general, an ink for a water-based ink ballpoint pen has such a low viscosity as 50 mPa·sec to 3 Pa·sec while that for an oil-based ink ballpoint pen having a similar form has a viscosity of 3 Pa·sec to 20 Pa·sec, and therefore when the pen is left standing upward or horizontally, the ink leaks out. Further, the ink is likely to be scattered by slight impact to stain hands and cloths, and therefore in order to prevent this, an ink follower is installed at a plug part in an ink reservoir.

A lot of ink followers which are blended with silica, metallic soap and a clay thickener as a viscosity controlling agent to increase a viscosity has so far been known.

However, ink followers blended with the above viscosity controlling agents are predominant in viscosity response, and therefore if they are used particularly for a water-based ink ballpoint pen of a bold type consuming a large amount of ink, brought about are the problems that starving of the drawn lines is induced in the middle of writing because of difficulty in following of the ink and that a part of an ink follower is adhered and remains on the inner wall of an ink reservoir in consuming the ink to result in causing shortage in the ink follower in the middle of writing to allow the ink to flow backward and a flow rate for writing becomes instable due to an influence of shortage in the ink follower. In the ballpoint pens of specifications other than the bold type, the same problems are brought about in a certain case when the writing speed is hastened.

Such problems are considered to originate in a slower following speed of an ink follower than a consuming speed of an ink.

Also, in an ink follower in which a viscosity is controlled to a lower level in order to improve the above problems, brought about are the problems that the follower and the ink are scattered when impact is applied to the pen body and that the ink follower flows out from the ink reservoir when the pen body is stored at a high temperature with the pen tip turned upward.

Further, known is an ink follower (called "a back leaking preventer" in a literature) blended with a hydrocarbon which is liquid at room temperature and a styrene base thermoplastic elastomer (for example, Japanese Patent No. 3016749).

However, in the ink follower (back leaking preventer) described in the above official gazette, the styrene base thermoplastic elastomer used is relatively high in a permanent distortion, a heat deformation and an elastic deformation with the passage of time, and therefore the ink follower itself is poor in stability with the passage of time. In particular, when writing is carried out after the pen body is left standing in a hot state of 30 to 50° C., a viscoelasticity of the ink follower is varied, and therefore a problem such as an extreme reduction in the ink flow rate are brought about.

In light of the conventional problems described above, the present invention intends to solve them, and an object thereof is to provide an ink follower which has stable followability regardless of a pen body specification, a flow rate for writing and a writing speed and does not cause back leaking of the ink originating in shortage of the ink follower in the middle of writing and scattering of the ink follower by impact applied to the pen body and which does not flow out from the ink reservoir in storing the pen body at a high temperature and provides a stable flow rate for writing. Also, it is a matter of course that provided is an ink follower which prevents the ink from volatilizing by shutting off the ink from the outside air (volatilization preventing property) and which prevents the ink from leaking in writing with the pen turned upward.

DISCLOSURE OF THE INVENTION

Intensive researches repeated by the present inventors on the conventional problems described above have resulted in obtaining research results described in details in the following items (1) to (3) and successfully obtaining an ink follower meeting the object described above based on them, and thus the present invention has come to be completed.

(1) That is, it is presumed that in conventional ink followers, the cause of generating inferior following at the time of the consumption of an ink originates in, as described above, a slower following speed of the ink follower than a consuming speed of an ink. This following speed depends on a viscosity of the ink follower to a large extent, and the ink follower having a higher viscosity value has a slower following speed and increased defects at the time of the consumption of the ink. Also, in an ink follower in which a viscosity is controlled to a lower level for a countermeasure thereof, brought about are the problems that the follower and the ink are scattered when impact is applied to the pen body and that the ink follower flows out from the ink reservoir when the pen body is stored at a high temperature with the pen tip turned upward. Also, if an ink follower which is controlled to viscosity predominance is used particularly for a water-based ink ballpoint pen (of a bold type) consuming a large amount of an ink, brought about are the problems that starving of the drawn lines is induced in the middle of writing because of difficulty in following of the ink and that a part of an ink follower is adhered and remains on the inner wall of an ink reservoir at the time of consuming the ink to result in causing shortage in the ink follower in the middle of writing to allow the ink to leak backward and flow rate for a writing becomes instable due to an influence of shortage in the ink follower. Accordingly, it used to be very difficult to control both of a following performance and a performance in applying impact with the physical properties of the ink follower.

Assuming that an ink follower satisfying initial performances such as followability and impact resistance can be prepared, inconveniences are brought about in a certain case depending on the way of use of the consumers if the above performances can not be maintained. For example, even if appropriate ink discharge can be secured when used immediately after purchasing, the followability is reduced to a large extent to bring about troubles on writing when rewriting after the pen body is left standing for a while (for example, not used for 1 to 2 months in a summer season). It is the existing situation that such a change in the performances is observed in many cases when using silica, a clay thickener, metallic soap and a styrene base thermoplastic elastomer thickener which have so far been introduced in preparing an ink follower.

(2) Most of ink followers has a so-called grease form in which a non-volatile or slightly volatile organic solvent (base oil) is blended with a viscoelasticity-providing agent to increase a viscosity.

In general, the above grease having such a quality that the base oil is deposited on a grease surface exerts, in many cases, an adverse effect on a product which the grease is used, and therefore various trials for inhibiting oil separation as much as possible have been carried out in conventional grease products. The same as described above applies to an ink follower, and when an ink follower in which a lot of oil is deposited is used for a water-based ink ballpoint pen, a base oil component separated in an ink reservoir transfers to an ink side to result in deteriorating the appearance, and the product value is likely to be reduced.

Further, in a water-based ink ballpoint pen which is left standing with a pen tip turned upward, a base oil component separated is lighter than the ink in many cases, and therefore brought about is the problem that the above base oil component stays in the tip to cause inferior writing.

However, the present inventors have actually examined and investigated various ink followers to find that ink followers predominant in elasticity response in which oil separates to such an extent that a base oil component does not move to an ink side in a refill are improved in a pen quality.

The above ink follower has high following response of the ink follower at the time of the consumption of the ink and is suited as well to a ballpoint pen of a bold type specification having a large flow rate, and it is characterized by having a high clear drain property. The reason therefor is that a base oil component which is suitably separated has a relatively low viscosity, so that it has action to lower frictional resistance between the inner wall of an ink reservoir and the ink follower in consuming the ink (when the ink follower moves), and the following response is considered to be improved.

If the ink follower is predominant in viscosity, time difference is caused, as described above, in following of the ink follower as the ink discharges. Accordingly, when a viscosity-predominant ink follower having a relatively high viscosity is used, starving is caused in writing at a twice or higher speed than usual.

Also, an ink follower in which a viscosity is controlled to a lower level in order to enhance response in following does not cause starving of the drawn lines, but when impact is applied to the pen body, the ink follower is liable to be scattered, and the ink blows off from a rear end part of the reservoir. Further, the ink follower is adhered and remains on the inner wall of the reservoir in consuming the ink and is gradually reduced in the amount, and finally the ink leaks backward due to shortage in the ink follower.

(3) On the other hand, an ink follower which is predominant in elasticity does not adhere and remain in an ink reservoir as compared with an ink follower which is predominant in viscosity, but the satisfactory following performance is not exhibited in many cases depending on the kind and the composition of a thickener which provides a viscoelasticity.

However, an ink follower which is predominant in elasticity and in which a base oil component is slightly deposited is reduced in frictional resistance between the ink reservoir and the ink follower, and therefore the following performance is improved further more regardless of the composition of the ink follower. Particularly in writing with a water-based ink ballpoint pen of a bold type or one using an ink having a relatively low viscosity in which a flow rate is large or in writing at a twice or more speed with a ballpoint pen in which the specification is not a bold type, it is confirmed that the drawn lines do not cause starving and that the effect of following response is very high. Further, it has both of a clear drain property of an ink and drop impact resistance which are originally the characteristics of the ink follower predominant in elasticity, and therefore the ink follower which is excellent in a quality balance can be obtained.

Accordingly, controlling of the ink follower to elasticity predominance makes it possible to reduce difficulty in following an ink and adhering and remaining of a part of the ink follower on the inner wall of the ink reservoir even in a ballpoint pen of a specification (of a bald type) having a large ink-flow rate, so that the flow rate for writing is stabilized. Further, it has been found that a change in the followability with the passage of time can be improved by using for a viscoelasticity-providing agent, a non-styrene base thermoplastic elastomer, for example, a vinyl chloride base thermoplastic elastomer, an olefin base thermoplastic elastomer, a polyamide base thermoplastic elastomer, a polyester base thermoplastic elastomer and a polyurethane base thermoplastic elastomer, and thus the present invention has come to be completed.

Accordingly, the present invention provides an ink follower meeting the object described above by assuming the respective constitutions described in the following items (1) to (2).

(1) An ink follower containing a non-volatile or slightly volatile organic solvent and a non-styrene base thermoplastic elastomer which is soluble or swollen in the organic solvent and showing viscoelasticity which is predominant in elasticity response, wherein a value of an oil separation degree test (60° C. 24 hours) according to JIS K 2220-5.7-1993 for the above ink follower is 0.2 to 15%.

(2) The ink follower as described in the above item (1), wherein the non-styrene base thermoplastic elastomer described above is at least one selected from the group consisting of a vinyl chloride base thermoplastic elastomer, an olefin base thermoplastic elastomer, a polyamide base thermoplastic elastomer, a polyester base thermoplastic elastomer and a polyurethane base thermoplastic elastomer.

BEST MODE FOR CARRYING OUT THE INVENTION

The embodiment of the invention shall be explained below in details.

The ink follower of the present invention comprises an ink follower containing a non-volatile or slightly volatile organic solvent and a non-styrene base thermoplastic elastomer which is soluble or swollen in the organic solvent and showing viscoelasticity which is predominant in elasticity response, and it is characterized by that a value of an oil separation degree test (60° C., 24 hours) according to JIS K 2220-5.7-1993 for the above ink follower is 0.2 to 15%.

As described above, the ink follower of the present invention has to (a) contain the non-volatile or slightly volatile organic solvent and the non-styrene base thermoplastic elastomer which is soluble or swollen in the organic solvent, (b) show viscoelasticity which is predominant in elasticity response and (c) have a value of 0.2 to 15% in an oil separation degree test (60° C., 24 hours) according to JIS K 2220-5.7-1993 for the above ink follower and each constitution of (a) to (c) shall be described below in details.

The non-volatile or slightly volatile organic solvent used for the ink follower of the present invention is used as a base oil for the ink follower, and for example, a mineral oil, polybutene and liquid paraffin can be used.

The specific polybutene which can be used includes, for example, Nissan Polybutene 200N and Polybutene 30N (all manufactured by NOF Corporation), Polybutene HV-15 (manufactured by Nippon Petrochemicals Co., Ltd.) and 35 R (manufactured by Idemitsu Kosan Co., Ltd.) which are commercial products.

The specific mineral oil which can be used includes, for example, Diana Process Oil NS-100, PW-32, PW-90, NR-68 and AH-58 (manufactured by Idemitsu Kosan Co., Ltd.) which are commercial products.

The above non-volatile or slightly volatile organic solvents can be used alone or in combination of two or more kinds thereof. A use amount thereof may be an amount in which the ink follower shows viscoelasticity predominant in elasticity response, and it is 70 to 99.8% by weight (hereinafter referred to merely as "%"), preferably 85 to 99.5% and more preferably 87 to 99.5% based on the total amount of the ink follower.

The non-styrene base thermoplastic elastomer used in the present invention which is soluble or swollen in the organic solvent described above is used as a viscoelasticity-providing agent, and it includes, for example, at least one (alone or a mixture of two or more kinds thereof) selected from the group consisting of a vinyl chloride base thermoplastic elastomer, an olefin base thermoplastic elastomer, a polyamide base thermoplastic elastomer, a polyester base thermoplastic elastomer and a polyurethane base thermoplastic elastomer.

The above non-styrene base thermoplastic elastomers are used in order to solve problem brought about by using conventional styrene base thermoplastic elastomers, that is, the point that stability of the ink follower with the passage of time is poor, particularly the problem that the ink flow rate is extremely reduced by a change in the viscoelasticity of the ink follower when writing after a pen body is left standing in a hot state of 30 to 50° C.

The vinyl chloride base thermoplastic elastomer (TPVC) used for the ink follower of the present invention is a thermoplastic elastomer (TPE) using PVC, NBR and the like for a hard segment and using PVC for a soft segment, and capable of being used are, for example, Sunprene EF50AB, ditto FG50EA, ditto FG60FA and ditto FE70K, Sunfrost KB85NA, ditto KD60EA and ditto KD90EA, Sumiflex K530DA, ditto K761B, ditto N270A and ditto N550C (manufactured by Advanced Plastic Compounds Company), Shin-Etsu Posmere SE-788, ditto SE-793, ditto SR-884, ditto SR-885, ditto SR-886, ditto UE-701, ditto UE-765, ditto UE-775, ditto UE-785, ditto UE-700 and ditto UE-795 (manufactured by Shin-Etsu Polymer Co., Ltd.), Zeon Elaster ES-6930 and ditto EP-6410 (manufactured by Zeon Kasei Co., Ltd.), Elastdarue E8300, ditto E8312, ditto M9102 and ditto M9103 (manufactured by Showa Kasei Kogyo Co., Ltd.), Denka LCS-Z-1050, ditto Z-1060, ditto Z-1070, ditto Z-6050, ditto Z-6060, ditto Z-6070, ditto Z-4070, ditto Z-3070, ditto Z-4570, ditto Z-3570 and ditto Z-4570 (manufactured by Denki Kagaku Kogyo Kabushiki Kaisha) which are commercial products.

The olefin base thermoplastic elastomer (TPO) used for the ink follower of the present invention is a TPE using polyolefin such as polypropylene and polyethylene for a hard segment and using EPDM for a soft segment, and capable of being used are, for example, Milastomer 6030N, ditto 803N, ditto 9070N, ditto 4800N, ditto S500 and ditto H0500 (manufactured by Mitsui Chemicals, Inc.), Engage 8842, ditto 8130, ditto, 8180, ditto 8150, ditto 8100, ditto 8200, ditto 8407, ditto 8452, ditto 8411, ditto 8003, ditto 8585, ditto 8401, ditto 8440, ditto 8480, ditto 8450, ditto 8402, ditto 8540, ditto 8445 and ditto 8403 (manufactured by Du Pont Dow Elastomers L.L.C.), Santoprene 101-55, ditto 101-64, ditto 101-73, ditto 101-80, ditto 101-87, ditto 103-40, ditto 103-50, ditto 111-45, ditto 111-55, ditto 111-64, ditto 111-73, ditto 111-80 and ditto 111-87 (manufactured by Advanced Elestomer Systems Japan Ltd.), Thermolan 2920, ditto 2940, ditto 3550, ditto 3650, ditto 3601, ditto 3801, ditto 3980 and ditto 5850 (manufactured by Mitsubishi Chemicals Corporation) which are commercial products.

The polyamide base thermoplastic elastomer (TPAE) used for the ink follower of the present invention is a block copolymer and the like using nylon for a hard segment and using a polyester or polyol (PTMG or PPG) for a soft segment, and capable of being used are, for example, UBE-PEA-1201, ditto 1200, ditto 1200J4, ditto 1200J2 and ditto 1201S (manufactured by Ube Industries, Ltd.), Grilon EL X23NZ, ditto 2112 and ditto 23, Grilamid ELY-2742, ditto 2702, ditto 20NZ, ditto 60, ditto 2475 and ditto 2694 (manufactured by EMS Chemie AG), Diamide PAE-E40, ditto E47, ditto E62, ditto L2121 and ditto L1901 (manufactured by DegussaHuels AG), Novamid PAE-1307R, ditto 1407 R, ditto 2207R and ditto 2407 R (manufactured by Mitsubishi Engineering Plastic Corporation) which are commercial products.

The polyester base thermoplastic elastomer (TPEE) used for the ink follower of the present invention is a multiblock copolymer using aromatic polyester having a high melting point and high crystallinity, for example, polybutylene terephthalate for a hard segment and using an amorphous polyether having a low glass transition temperature (for example, −70° C. or lower), for example, polytetramethylene ether glycol (PTMG) for a soft segment and a TPE of a type using an aliphatic polyester for a soft segment, and capable of being used are, for example, Pelprene P-30B, ditto P-40B, ditto P-40H, ditto P-55B, ditto P-70B, ditto P-90B, ditto P-150B, ditto P-280B, ditto E-450B, ditto P-150M, ditto S-1001, ditto S-2001, ditto S-3001, ditto S-6001 and ditto S-9001 (manufactured by Toyobo Co., Ltd.), Hytrel G3548, ditto 4047, ditto 4767, ditto 5557, ditto 6347, ditto 7247, ditto 3048, ditto 2571, ditto 4777, ditto 6377, ditto 7277, ditto 474B, ditto 4275JB, ditto 5557M, ditto 7247M and ditto 4057 (manufactured by Du Pont-Toray Co., Ltd.) which are commercial products.

The polyurethane base thermoplastic elastomer (TPU) used for the ink follower of the present invention includes an incompletely plasticized type having a partial cross linking in a molecule and a completely linear polymer of a complete thermoplastic type. Various polymers can be prepared depending on the kinds and the amounts of diisocyanates and long and short chain polyols, wherein a polymer chain comprising a diisocyanate and a short chain glycol is a hard segment, and a polymer chain comprising a diisocyanate and a polyol is a soft segment, and a caprolactone type, an adipic acid type and a polytetramethylene glycol type [PTMG type (or an ether type)] can be used. It includes, for example, Esten 58133, ditto 58440, ditto 58277, ditto 58315, ditto 5715, ditto 58202, ditto 54600 and ditto 54630 (manufactured by Kyowa Hakko Kogyo Co., Ltd.), Kuramiron U-1180, ditto 1190, ditto 1195, ditto 3180, ditto 3190, ditto 3195, ditto 6170, ditto 6180, ditto 6190, ditto 9180, ditto 9190, ditto 9195, ditto 2780, ditto 2790, ditto 2795, ditto 6780 and ditto 6795 (manufactured by Kuraray Co., Ltd.), Resamine P-1045, ditto 1078, ditto 1098, ditto 7045, ditto 7070, ditto 2045, ditto 2060, ditto 4060, ditto 4090, ditto 4200, ditto 4585, ditto 4590, ditto 8765, ditto 880 and ditto 890 (manufactured by Dainichiseika Color & Chemicals Mfg. Co., Ltd.) which are commercial products.

The above non-styrene base thermoplastic elastomers which are the viscoelasticity-providing agents can be used alone or in combination of two or more kinds thereof. A use amount thereof may be an amount in which the ink follower shows viscoelasticity predominant in elasticity response, and it is 0.2 to 30%, preferably 0.5 to 15% and more preferably 0.5 to 10% based on the total amount of the ink follower.

In the ink follower of the present invention, the non-volatile or slightly volatile organic solvent and the non-styrene base thermoplastic elastomer which is soluble or swollen in the organic solvent have to be contained, and in addition thereto, (b) viscoelasticity which is predominant in elasticity response has to be shown. Usually, tan δ can be used as an index of a strength of viscoelasticity. In this case, tan δ is a value meaning loss modulus/storage modulus. The large value thereof (tan δ>1) shows that the fluidity is high (or predominant in viscosity), and the small value (tan δ>1) shows that the follower is solid (or predominant in elasticity).

Accordingly, in order to show viscoelasticity which is predominant in elasticity response in the ink follower of the present invention, the value of tan δ is 0.1 to 2.0, preferably 0.3 to 1.0 and more preferably 0.5 to 1.0 in the whole frequency region of 1 to 63 rad/sec. An average value of tan δ measured in the respective frequencies is preferably 1.0 or less.

In the present invention, if the value of tan δ exceeds 2.0 in the whole frequency region described above, brought about are the problems that the following response of the ink follower in the ink reservoir at the time of the consumption of the ink is inferior and that the ink follower is liable to be scattered when applying impact on the pen body. On the other hand, if the value of tan δ is less than 0.1 in the whole frequency region described above, elasticity of the ink follower is too strong, and therefore it is difficult to charge it into the ink reservoir, so that practicality thereof is lost.

The better viscoelasticity which is predominant in elasticity response is shown by controlling the average value of tan δ measured in the respective frequencies to 1.0 or less.

In the present invention, assumed is a constitution in which (a) the non-volatile or slightly volatile organic solvent and the non-styrene base thermoplastic elastomer which is soluble or swollen in the organic solvent are contained and (b) viscoelasticity that is predominant in elasticity response is shown and, in which base oil component is slightly deposited in the ink follower predominant in elasticity.

In the present invention, the base oil component is slightly deposited in the ink follower to thereby further reduce frictional resistance between the ink reservoir and the ink follower, and therefore the following performance is enhanced further more. Particularly in writing with a water-based ink ballpoint pen of a bold type or one using an ink having a relatively low viscosity in which a flow rate is large or in writing at a twice or more speed with a ballpoint pen in which the specification is not a bold type, the drawn lines do not cause starving, and the effect of following response can be enhanced very much. Further, it has both of a clear drain property of an ink and drop impact resistance which are originally the characteristics of an ink follower predominant in elasticity, and therefore the ink follower which is excellent in a quality balance can be obtained.

The deposition of the above base oil component can be compared by carrying out an oil separation degree test, to be specific, an oil separation degree test (60° C., 24 hours) according to JIS K 2220-5.7-1993. In the present invention, in order to assume a constitution in which the base oil component is slightly deposited, a value in the oil separation degree test described above has to fall in a range of 0.2 to 15 %, preferably 1.0 to 10 %.

In the oil separation degree test method prescribed in JIS K 2220-5.7-1993, a sample for measurement is filled into a metal-made screen conical filter prescribed in a JIS standard and left standing for 24 hours under the environment of 100° C. to measure an amount of oil deposited from the screen conical filter.

Also in the ink follower in the present invention, to be general, the method prescribed above can be adopted for an oil separating property (oil separation degree), but a part of the measuring conditions is preferably changed because of the following reason.

That is, Most of viscoelasticity-controlling agents which can provide elasticity is polymers such as thermoplastic elastomers, and if ink followers are prepared using them, the followers present fluidity at about 100° C. to bring about reduction in a viscosity to a large extent in many cases. Accordingly, if the ink follower is left standing at 100° C., also the ink follower providing a high performance to a ballpoint pen shows, as described above, reduction in a viscosity to a large extent, and components other than the oil component flow out to the outside of the screen conical filter, so that the reliability of the measurement itself is reduced to a large extent. Accordingly, considering the actual use environment of a ballpoint pen, a pen body is hardly left standing at 100° C., and therefore it is not realistic to measure the deposition of oil at 100° C.

On the other hand, when a condition for measuring an oil separation degree is set to 60° C.-24 h, large correlation between a measured value of oil separation and a performance of the pen body has been observed in an elasticity-predominant ink follower. It has been confirmed that an ink follower which reveals an oil separating property falling in a specific range under the above temperature condition is excellent in both of a clear drain property and drop impact resistance. Also in an acceleration test of a pen body with the passage of time, evaluation under storage at 50 to 60° C. is adopted in many cases, and therefore measurement at 60° C. is preferred from the viewpoint of evaluating a pen performance with the passage of time.

Accordingly, the oil separation degree test in the present invention is carried out at 60° C.-24 h in place of 100° C.-24 h in an oil separation degree test prescribed in JIS K 2220-5.7-1993.

In the present invention, if the oil separation degree in the oil separation degree test (60° C.-24 h) is less than 0.2%, frictional resistance between the ink reservoir and the ink follower is not reduced so much, and therefore a satisfactory following performance in the pen body is not exhibited. On the other hand, if the oil separation degree exceeds 15.0%, the base oil component moves to an ink side in the ink reservoir even in the elasticity-predominant ink follower to bring about the deteriorated appearance and inferior writing in a certain case, and therefore such ranges are not preferred.

In the present invention, a thickening aid (silica, a clay thickener, metallic soap and the like), a surfactant and an antioxidant may further be added, if necessary, as the other components to the ink follower containing the non-volatile or slightly volatile organic solvent described above and the non-styrene base thermoplastic elastomer which is soluble or swollen in the organic solvent. However, compounds which raise the value of tan δ are included in a thickening aid, a surfactant and an antioxidant, and if they are added more than required, tan δ is likely to exceed 2.0 even if a prescribed amount of the thickener is added. Accordingly, attentions have to be paid when adding them.

In a production process for the ink follower of the present invention, a viscoelasticity-providing agent can be dissolved in the base oil by stirring and kneading with heating, if necessary.

Further, the ink follower produced is blended again by means of a disperser such as a roll mil and a kneader and heated, whereby the viscoelasticity can be controlled. To more specifically explain, when a tan δ value of the ink follower produced is lower than expected, it is blended again by means of a disperser such as a roll mil and a kneader to break the thickening structure, whereby the tan δ value can be raised. In contrast with this, when the tan δ value is higher than expected, the ink follower is reheated to not lower than a glass transition point of the thickener (polymer), whereby the thickening mechanism of the polymer is improved to strengthen the thickening structure and the tan δ can be reduced.

The ink follower of the present invention raises further a pen performance such as followability by suitably depositing the base oil component. The degree (oil separation degree) of the deposition of the base oil component can be controlled by adopting the following controlling methods (1) to (6). These controlling methods (1) to (6) can be used alone or in suited combination of two or more kinds thereof.

A method for enhancing the oil separation degree includes the respective methods such as (1) blending the base oil in a little excess to control a concentration of the thickener to a lower level, (2) when using the polymer base thickener, carrying out stirring under heating at as low temperature as possible, (3) reducing the ability of stirring and blending of a roll mill and a kneader to make the dispersion of the thickener a little uneven and (4) leaving the ink follower produced standing at a relatively high temperature (preferably 30 to 60° C.) for several days.

Further, a method for reducing the oil separation degree includes the respective methods such as (5) raising a blending amount of the thickener to strengthen a thickening structure and to enhance the power of holding the base oil and (6) elevating the stirring and blending ability of a roll mill and a kneader to uniformize the dispersion of the thickener.

The ink follower of the present invention is used by installing at a plug part in an ink reservoir for a writing instrument such as a water-based ink ballpoint pen and an oil-based ink ballpoint pen.

In the ink follower of the present invention thus constituted, an object thereof is to provide an ink follower which has stable followability regardless of a pen body specification, a flow rate for writing and a writing speed and does not cause back leaking of the ink originating in shortage of the ink follower in the middle of writing and scattering of the ink follower by impact applied to the pen body and which does not flow out from the ink reservoir in storing the pen body at a high temperature and provides a stable flow rate for writing by containing the non-volatile or slightly volatile organic solvent and the non-styrene base thermoplastic elastomer which is soluble or swollen in the organic solvent and showing viscoelasticity which is predominant in elasticity response and controlling a value of an oil separation degree test (60° C., 24 hours) according to JIS K 2220-5.7-1993 for the above ink follower to 0.2 to 15%. Also, it is a matter of course that the ink is prevented from volatilizing by shutting off the ink from the outside air (volatilization preventing property) and that the ink is prevented from leaking in writing with the pen turned upward.

EXAMPLES

Next, the present invention shall more specifically be explained with reference to examples and comparative examples, but the present invention shall by no means be restricted by the following examples.

Examples 1 to 9 and Comparative Examples 1 to 6

Water-based inks (Inks 1 to 3, the total amounts each corresponding to 100% by weight) for a ballpoint pen used in the respective examples and comparative examples were prepared according to blend compositions shown below.

| Preparation of Ink 1 | |
|---|---|
| Dye: Water Black R455 (manufactured by Orient Chemical Ind., Ltd.) | 7.0% by weight |
| Dye: Water Yellow 6C (manufactured by Orient Chemical Ind., Ltd.) | 1.0% by weight |
| Liquid medium: propylene glycol | 20.0% by weight |
| Viscosity controlling agent: xanthan gum (KELZAN HP) (manufactured by Sansho Co., Ltd.) | 0.2% by weight |
| Surfactant: potassium oleate | 0.5% by weight |
| Preservative: sodium omadine | 0.1% by weight |
| Rust preventive: benzotriazole | 0.1% by weight |
| Ion-exchanged water | balance |

The above mixture was stirred and then filtered to obtain a water-based black ink for a ballpoint pen.

| Preparation of Ink 2 | |
|---|---|
| Pigment: carbon black (Printex 25) (manufactured by Degussa AG) | 7.0% by weight |
| Dispersant: polyvinylpyrrolidone (PVP-K30) (manufactured by GAF Co., Ltd.) | 3.5% by weight |
| Liquid medium: glycerin | 10.0% by weight |
| Viscosity controlling agent: cross-linking type polyacrylic acid (Hiviswako 105) (manufactured by Wako Pure Chemical Industries Ltd.) | 0.4% by weight |
| Surfactant: potassium ricinoleate | 0.5% by weight |
| pH controlling agent: triethanolamine | 1.0% by weight |
| Preservative: 1,2-benzoisothiazoline-3-one | 0.1% by weight |
| Rust preventive: benzotriazole | 0.1% by weight |
| Ion-exchanged water | balance |

The above mixture was stirred and then filtered to obtain a water-based black ink for a ballpoint pen.

| Preparation of Ink 3 | |
|---|---|
| Pigment: phthalocyanine blue (Chromofine Blue 4965, manufactured by Dainichiseika Color & Chemicals MFG. Co., Ltd.) | 1.5% by weight |
| Pigment: titanium oxide (TITONE R-11P, manufactured by Sakai Chemical Industry Co., Ltd. | 20.0% by weight |
| Dispersant: styrene maleic acid resin ammonium salt | 2.5% by weight |
| Liquid medium: ethylene glycol | 5.0% by weight |
| Viscosity controlling agent: xanthan gum (KELZAN HP) (manufactured by Sansho Co., Ltd.) | 0.2% by weight |
| Surfactant: potash soap | 0.5% by weight |

-continued

| Preparation of Ink 3 | |
|---|---|
| pH controlling agent: aminomethylpropanol | 0.3% by weight |
| Preservative: sodium omadine | 0.1% by weight |
| Rust preventive: saponin | 0.1% by weight |
| Ion-exchanged water | balance |

The above mixture was stirred and then filtered to obtain a water-based blue ink for a ballpoint pen.

Ink followers used in the respective examples and comparative examples were prepared according to compositions shown in the following Table 1 and Table 2 and preparing methods A to D shown below.

Ink follower preparing methods A to D

Ink Follower Preparing Method: A Method:
A base oil and a thickener (and additives) were blended and stirred at 150 to 180° C. for about 120 minutes at a high speed by means of a mixer. After cooled down to room temperature, the mixture was subjected once to roll treatment to obtain an ink follower.

Ink Follower Preparing Method: B Method:
A base oil and a thickener (and additives) were blended and stirred at 160 to 170° C. for about 180 minutes at a high speed by means of a mixer and cooled down to room temperature. Then, the mixture was kneaded for 60 minutes by means of a kneader to obtain an ink follower.

Ink Follower Preparing Method: C Method:
A base oil and a thickener (and additives) were blended and stirred at 170 to 190° C. for about 120 minutes at a low speed by means of a mixer and cooled down to room temperature to obtain an ink follower.

Ink Follower Preparing Method: D Method:
A base oil and a thickener (and additives) were blended and stirred at room temperature for about 120 minutes at a high speed by means of a mixer. Then, the mixture was subjected once to roll treatment and vacuum-defoamed to obtain an ink follower.

An oil separation degree and a tan δ of the oil followers obtained by the respective methods described above were measured by the following methods.

Then, 0.1 g of one of the above ink followers having the respective characteristics and 1.0 g of one of the inks 1 to 3 described above were filled according to the respective formation shown in the following Table 1 and Table 2 into an ink reservoir (refill tube) of a ballpoint pen body having a ball diameter of 1.0 mm manufactured by Mitsubishi Pencil Co., Ltd., and the respective pen bodies were subjected to the evaluation tests by the following methods for the respective items of (1) followability in writing at a high speed, (2) scattering of the ink follower caused by drop impact, (3) adhesion of the ink follower onto the tube in consuming the ink, (4) flow rate stability for writing, (5) inversion and back leaking of the ink follower and (6) ink discharge stability with the passage of time in heating the pen body.

The results thereof are shown in the following Table 1 and Table 2.

Measuring Method of Oil Separation Degree (According to JIS K 2220-5.7-1993)
A measuring apparatus having the following constitution was used.

Screen conical filter: a conical part is a nickel screen having a nominal dimension of 250 μm prescribed in JIS Z 8801-1993, and a nickel wire having a diameter of about 0.8 mm is brazed in the periphery of the upper part to install a nickel wire hanger having the same diameter.

Beaker: prescribed in JIS K 2039-1993.

Cover: made of brass having a thickness of about 1 mm, and a hook made of brass having a diameter of about 1.5 mm is brazed on an inner face of almost the center thereof.

Gasket: having a diameter of the same dimension as an inner diameter of the cover and made of synthetic rubber having a thickness of about 1.5 mm, wherein a hole of about 20 mm is provided in the center part.

Measuring Environment
   Measuring temperature: 60±0.5° C.
   Time for leaving standing: 24 hours Measuring Method
The screen conical filter was filled with about 10 g of a sample and hung on the hook of the cover. This was stored in the beaker and put in a constant temperature bath for prescribed time. The beaker was taken out from the constant temperature bath and cooled down to room temperature, and then oil adhered on the cone was transferred into the beaker to determine a mass of the separated oil in the beaker according to the following calculating equation:

oil separation degree calculating equation:

$$A = C/B \times 100$$

(wherein A: oil separation degree (%), B: mass (g) of the sample and C: mass (g) of the separated oil)

Measuring Method of Tan δ Value
   Measuring Apparatus
      Dynamic Spectrometer RDS-II (manufactured by Rheometric Scientific Co., Ltd.)

Measuring conditions (frequency dependency)
   Geometry: parallel plate 50 mmø dynamic measurement
   Sweep Type: Frequency Sweep
   Frequency range: 0.06 to 650 rad/sec
   Measuring interval: 5 points/decade
   Deformation: 100%
   Measuring temperature: 25° C.
   Environment: in nitrogen flow (1) Evaluation Method of Followability in Writing at a High Speed
Writing was carried out free hand on a writing paper meeting an ISO standard at a twice speed and a normal speed using the respective pen bodies to evaluate the respective written lines according to the following evaluation criteria.

Evaluation Criteria:
   ⊚: starving is observed in writing at both of a twice speed and a normal speed, and writable smoothly and stably
   ○: slight skip is caused at a twice speed, and writable at a normal speed
   Δ: apparent skip is caused at a twice speed, and writable at a normal speed
   ×: ink does not follow even when normally written, and skip is caused (2) Evaluation Method of Scattering of the Ink Follower by Drop Impact
The respective pen bodies were dropped once from 1.5 m over a cedar board having a thickness of 2 cm with the pen tip turned upward, and the pen bodies after dropped were visually observed to evaluate the degree of scattering of the ink follower to the outside of the ink reservoir according to the following evaluation criteria.

Evaluation Criteria:
  ○: scattering of the ink follower is not observed, and an interface between the ink and the ink follower is clear
  Δ: scattering of the ink follower is not observed, but an interface between the ink and the ink follower is a little disturbed as compared with before the pen body is dropped
  ×: scattering of the ink follower is apparently observed, and the ink leaks backward to the outside of the tube (3) Evaluation Method of Adhesion of the Ink Follower onto the Tube in Consuming the Ink Spiral writing was carried out on a writing paper meeting the ISO standard under the following conditions by means of a writing test machine until the ink was exhausted, and the refill tube after writing was visually observed to evaluate the adhesion of the ink follower onto the inner wall of the tube according to the following evaluation criteria.

Evaluation Criteria:
  ⊚: adhesion of the ink follower onto the inner wall of the tube is scarcely observed
  ○: adhesion of the ink follower onto the inner wall of the tube is slightly observed
  Δ: adhesion of the ink follower onto the inner wall of the tube is apparently observed
  ×: all ink follower is adhered onto the inner wall of the tube, and the ink follower falls into shortage in the middle of writing (4) Evaluation Method of Discharge Stability of the Ink Spiral writing was carried out with the respective pen bodies on a writing paper meeting the ISO standard under the following conditions by means of a writing test machine until the ink was exhausted, and the change of discharge and the state of the drawn lines every 100 m were evaluated according to the following evaluation criteria.

Writing conditions: writing speed: 4.5 m/minute, writing angle: 60° and writing load: 100 g Evaluation Criteria:
  ⊚: flow rate is stable, and starving and density unevenness are not caused until the ink is exhausted
  ○: flow rate is slightly scattered, but starving and density unevenness are not caused until the ink is exhausted
  Δ: flow rate is a little disturbed, and starving and density unevenness are slightly observed
  ×: flow rate is scattered to a large extent, and starving and density unevenness are apparently observed (5) Evaluation Method of Inversion and Back Leaking of the Ink Follower The respective pen bodies were left standing for one month under the conditions of 50° C. and a humidity of 65% with the pen tip (cap side) turned upward, and after taken out, the refill was visually observed to evaluate mixing of the base oil component contained in the ink follower into the ink (called inversion) and the presence of leaking of the oil to the outside of the refill according to the following evaluation criteria.

Evaluation Criteria:
  ○: inversion of the oil into the ink or leaking of the oil to the outside of the refill is not observed
  ×: inversion of the oil into the ink or leaking of the oil to the outside of the refill is observed (6) Ink Discharge Stability of the Pen Body with the Passage of Time in Heating The respective pen bodies were left standing for one month under the conditions of 50° C. and a humidity of 65% with the pen tip (cap side) turned horizontally, and after taken out, spiral writing was carried out with the respective pen bodies on a writing paper meeting the ISO standard under the following conditions by means of a writing test machine until the ink was exhausted, and the change of the ink flow rate and the state of the drawn lines every 100 m were evaluated by comparison with the initial state (evaluation (4)).

Evaluation Criteria:
  ○: flowability of the ink and unevenness in the density are almost not changed from those in the initial state
  Δ: flowability of the ink and unevenness in the density are a little changed as compared with those in the initial state, and the writing performance is slightly reduced
  ×: flowability of the ink and unevenness in the density are changed to a large extent as compared with those in the initial state, and the writing performance is apparently reduced

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| Kind of ink used | | | 1 | 2 | 3 | 1 | 2 | 1 | 3 | 1 | 2 |
| Ink follower blend composition | Base oil | Polybutene*1 | | 96.5 | 95.0 | | | 97.5 | | | 97.5 |
| | | Mineral oil*2 | 95.0 | | | 93.0 | 90.5 | | 97.5 | 97.0 | |
| | Visco-elasticity providing agent | Vinyl chloride base thermoplastic elastomer*3 | 5.0 | | | | | | | | 1.5 |
| | | Olefin base thermoplastic elastomer-1*4 | | 3.5 | | | | | | 1.0 | 1.0 |
| | | Olefin base thermoplastic elastomer-2*5 | | | 4.5 | | | | | | |
| | | Polyamide base thermoplastic elastomer*6 | | | | 7.0 | | | | 2.0 | |
| | | Polyester base thermoplastic elastomer-1*7 | | | | | 9.5 | | | | |
| | | Polyester base thermoplastic elastomer-2*8 | | | | | | 2.0 | | | |
| | | Polyurethane base thermoplastic elastomer*9 | | | | | | | 2.5 | | |

TABLE 1-continued

|  |  | Example | | | | | | | | |
|---|---|---|---|---|---|---|---|---|---|---|
|  |  | 1 | 2 | 3 | 4 | 5 | 6 | 7 | 8 | 9 |
|  | Additive: fluorine base surfactant*10 |  |  | 0.5 |  | 0.5 |  |  |  |  |
| Preparing method of ink follower |  | A | B | C | B | C | A | B | B | A |
| Ink follower physical property | Oil separation degree (60° C., 24 h) | 1.0 | 3.4 | 0.9 | 0.5 | 0.3 | 13.4 | 9.8 | 5.3 | 13.7 |
|  | tan δ value 1.0 rad/sec | 0.71 | 0.65 | 0.52 | 0.42 | 0.39 | 1.00 | 0.62 | 0.73 | 0.74 |
|  | tan δ value 4.0 rad/sec | 0.77 | 0.74 | 0.58 | 0.45 | 0.47 | 0.98 | 0.71 | 0.79 | 0.88 |
|  | tan δ value 6.3 rad/sec | 0.76 | 0.80 | 0.63 | 0.43 | 0.49 | 0.96 | 0.77 | 0.81 | 0.89 |
|  | tan δ value 10 rad/sec | 0.70 | 0.90 | 0.66 | 0.46 | 0.54 | 0.88 | 0.85 | 0.77 | 0.94 |
|  | tan δ value 40 rad/sec | 0.82 | 0.99 | 0.72 | 0.51 | 0.62 | 0.97 | 0.98 | 0.87 | 1.03 |
|  | tan δ value 63 rad/sec | 0.83 | 1.03 | 0.74 | 0.55 | 0.63 | 1.13 | 1.10 | 0.93 | 1.05 |
|  | tan δ average value | 0.77 | 0.85 | 0.64 | 0.47 | 0.52 | 0.99 | 0.84 | 0.82 | 0.92 |
| Evaluation of pen body | (1) Followability in writing at a high speed | ◎ | ◎ | ○ | ◎ | ◎ | ◎ | ◎ | ◎ | ◎ |
|  | (2) Scattering of the ink follower caused by drop impact | ○ | ○ | ○ | ○ | ○ | ○ | ○ | ○ | ○ |
|  | (3) Adhesion of the ink follower onto the tube in consuming the ink | ◎ | ◎ | ◎ | ◎ | ◎ | ◎ | ◎ | ◎ | ◎ |
|  | (4) Flow rate stability for writing | ◎ | ◎ | ◎ | ◎ | ○ | ◎ | ◎ | ◎ | ◎ |
|  | (5) Inversion and back leaking of the ink follower | ○ | ○ | ○ | ○ | ○ | ○ | ○ | ○ | ○ |
|  | (6) Ink discharge stability with the passage of time in heating the pen body | ○ | ○ | ○ | Δ | Δ | ○ | ○ | ○ | ○ |

TABLE 2

|  |  |  | Comparative Example | | | | | |
|---|---|---|---|---|---|---|---|---|
|  |  |  | 1 | 2 | 3 | 4 | 5 | 6 |
| Kind of ink used |  |  | 3 | 2 | 2 | 1 | 3 | 2 |
| Ink follower blend composition | Base oil | Polybutene*1 |  | 89.5 |  | 96.0 | 97.0 |  |
|  |  | Mineral oil*2 | 97.5 |  | 95.0 |  |  | 98.0 |
|  | Visco-elasticity providing agent | Styrene base thermoplastic elastomer-1*11 |  | 4.0 |  |  |  |  |
|  |  | Styrene base thermoplastic elastomer-2*12 |  |  | 5.0 |  |  |  |
|  |  | Fine particle silica*13 | 2.5 | 4.0 |  | 3.5 |  |  |
|  |  | Dimethyldioctadecylammonium bentonite*14 |  | 3.0 |  |  | 3.0 | 1.5 |
|  | Additive: fluorine base surfactant*10 |  |  |  |  | 0.5 |  | 0.5 |
| Preparing method of ink follower |  |  | D | B | C | D | D | D |
| Ink follower physical property | Oil separation degree (60° C., 24 h) |  | 0.1 | 0.5 | 0.8 | 0.1< | 0.1< | 7.9 |
|  | tan δ value 1.0 rad/sec |  | 27.1 | 1.96 | 0.68 | 5.83 | 3.05 | 35.3 |
|  | tan δ value 4.0 rad/sec |  | 31.8 | 2.43 | 0.83 | 7.26 | 3.17 | 33.0 |
|  | tan δ value 6.3 rad/sec |  | 28.4 | 2.77 | 0.81 | 7.89 | 3.43 | 29.6 |
|  | tan δ value 10 rad/sec |  | 25.0 | 3.16 | 0.77 | 9.44 | 3.82 | 28.2 |
|  | tan δ value 40 rad/sec |  | 23.9 | 3.42 | 0.62 | 13.7 | 4.41 | 28.4 |
|  | tan δ value 63 rad/sec |  | 22.1 | 3.70 | 0.69 | 19.2 | 4.99 | 28.0 |
|  | tan δ average value |  | 26.4 | 2.91 | 0.73 | 10.55 | 3.81 | 30.42 |
| Evaluation of pen body | (1) Followability in writing at a high speed |  | ○ | ○ | ◎ | Δ | ◎ | ◎ |
|  | (2) Scattering of the ink follower caused by drop impact |  | Δ | ○ | ○ | ○ | X | X |
|  | (3) Adhesion of the ink follower onto the tube in consuming the ink |  | X | ◎ | ◎ | Δ | X | ○ |
|  | (4) Flow rate stability for writing |  | X | ◎ | ○ | Δ | Δ | ◎ |
|  | (5) Inversion and back leaking of the ink follower |  | ○ | ○ | ○ | ○ | ○ | X |
|  | (6) Ink discharge stability with the passage of time in heating the pen body |  | ○ | Δ | X | ○ | ○ | ○ |

The following compounds were used for *1 to *14 in Table 1 and Table 2 described above.

*1: Polybutene 30N (manufactured by NOF Corporation)
*2: Diana Process Oil PW-380 (manufactured by Idemitsu Kosan Co., Ltd.)
*3: Sunprene EF50EA (manufactured by Advanced Plastic Compounds Company)
*4: Milastomer 803N (manufactured by Mitsui Chemicals, Inc.)
*5: Engage 8842 (manufactured by Du Pont Dow Elastomers L.L.C.)
*6: UBE PEA-1201S (manufactured by Ube Industries, Ltd.)
*7: Pelprene P-30B (manufactured by Toyobo Co., Ltd.)
*8: Pelprene P-280B (manufactured by Toyobo Co., Ltd.)
*9: Kuramiron U-1195 (manufactured by Kuraray Co., Ltd.)
*10: Eftop EF-801 (manufactured by Mitsubishi Material Corporation)
*11: Septon 2063 (manufactured by Kuraray Co., Ltd.)
*12: Tuftec 1141 (manufactured by Asahikasei Corporation)
*13: AEROSIL-974D (manufactured by Aerosil Japan Co., Ltd.)
*14: Benton 34 (manufactured by Wilbur Ellis Co., Ltd.)

As apparent from the results shown in Table 1 and Table 2 described above, it has become clear that in Examples 1 to 9 falling in the scope of the present invention as compared with Comparative Examples 1 to 6 falling outside the scope of the present invention, the followability in writing at a high speed is excellent, scattering of the ink follower by drop impact and adhering of the ink follower onto the tube in consuming the ink are not caused and the discharge stability of the ink is excellent as well and further that inversion and back leaking of the ink follower are not caused and the ink flows stably with the passage of time in heating the pen body so that all performances can be satisfied.

INDUSTRIAL APPLICABILITY

According to the present invention, an object thereof is to provide an ink follower which has stable followability regardless of a pen body specification, a flow rate for writing and a writing speed and does not cause back leaking of the ink originating in shortage in the ink follower in the middle of writing and scattering of the ink follower by impact applied to the pen body and which does not flow out from the ink reservoir in storing the pen body at a high temperature and provides a stable flow rate for writing. Further, it is a matter of course that provided is an ink follower which prevents the ink from volatilizing by shutting off the ink from the outside air (volatilization preventing property) and which prevents the ink from leaking in writing with the pen turned upward.

The invention claimed is:

1. An ink follower containing a non-volatile or slightly volatile organic solvent and a non-styrene base thermoplastic elastomer which is soluble or swollen in the organic solvent and showing viscoelasticity which is predominant in elasticity response, wherein a value of an oil separation degree test (60° C., 24 hours) according to JIS K 2220-5.7-1993 for the above ink follower is 0.2 to 15%.

2. The ink follower as described in claim 1, wherein the non-styrene base thermoplastic elastomer is at least one selected from the group consisting of a vinyl chloride base thermoplastic elastomer, an olefin base thermoplastic elastomer, a polyamide base thermoplastic elastomer, a polyester base thermoplastic elastomer and a polyurethane base thermoplastic elastomer.

* * * * *